United States Patent
Yan et al.

(10) Patent No.: US 11,777,887 B2
(45) Date of Patent: Oct. 3, 2023

(54) REMINDER METHOD AND APPARATUS IN GROUP SESSION, DEVICE AND MEDIUM

(71) Applicant: TENCENT TECHNOLOGY (SHENZHEN) COMPANY LIMITED, Shenzhen (CN)

(72) Inventors: Xi Yan, Shenzhen (CN); Bohan Cai, Shenzhen (CN); Xucheng Tang, Shenzhen (CN); Guojian Tan, Shenzhen (CN); Xinhua Ye, Shenzhen (CN); Qing Huang, Shenzhen (CN); Junjie Liang, Shenzhen (CN); Yanlan Liu, Shenzhen (CN); Hongfa Qiu, Shenzhen (CN); Runjia Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/724,029

(22) Filed: Apr. 19, 2022

(65) Prior Publication Data
US 2022/0239617 A1    Jul. 28, 2022

Related U.S. Application Data

(63) Continuation of application No. PCT/CN2020/127774, filed on Nov. 10, 2020.

(30) Foreign Application Priority Data

Mar. 22, 2020    (CN) .......................... 202010204905.6

(51) Int. Cl.
*H04L 51/224*    (2022.01)
(52) U.S. Cl.
CPC ................................. *H04L 51/224* (2022.05)

(58) Field of Classification Search
None
See application file for complete search history.

(56) References Cited

U.S. PATENT DOCUMENTS

| 7,478,129 B1 * | 1/2009 | Chemtob ............ H04L 65/4038 |
| | | 709/204 |
| 10,397,177 B2 | 8/2019 | Wang et al. |

(Continued)

FOREIGN PATENT DOCUMENTS

| CN | 104333504 A | 2/2015 |
| CN | 105162689 A | 12/2015 |

(Continued)

OTHER PUBLICATIONS

The State Intellectual Property Office of the People's Republic of China (SIPO) Office Action 1 for for 202010204905.6—dated Feb. 3, 2021 8 Pages (including translation).

(Continued)

*Primary Examiner* — Toan H Vu
(74) *Attorney, Agent, or Firm* — ANOVA LAW GROUP PLLC

(57) ABSTRACT

A reminder method includes: displaying a group session interface of the group session, the group session being a group session in which a group member is allowed to use a group tool, the group tool being a program function that supports use by at least two group members together; displaying a group tool message on the group session interface, the group tool message including an entry link of the group tool; displaying, in response to that the group tool message is a message with a group attribute, a reminder control corresponding to the group tool in the group session interface, the reminder control being used as a reminder of an item in the group tool. The present disclosure provides a (Continued)

human-computer interaction solution for effectively transmitting the group tool message to the group member.

20 Claims, 20 Drawing Sheets

(56) References Cited

U.S. PATENT DOCUMENTS

| | | | |
|---|---|---|---|
| 10,938,756 B2 | 3/2021 | Liu et al. | |
| 2008/0052203 A1 | 2/2008 | Beyer et al. | |
| 2011/0161852 A1* | 6/2011 | Vainio | G06F 3/0488 |
| | | | 715/810 |
| 2013/0263009 A1* | 10/2013 | Kim | H04L 51/52 |
| | | | 715/739 |
| 2014/0173467 A1* | 6/2014 | Clavel | H04L 12/1822 |
| | | | 715/758 |
| 2015/0135094 A1* | 5/2015 | Donneau-Golencer | |
| | | | H04L 12/1886 |
| | | | 715/752 |
| 2015/0163321 A1 | 6/2015 | Abou et al. | |
| 2017/0003866 A1* | 1/2017 | Bennett | G06F 3/048 |
| 2018/0341387 A1* | 11/2018 | Segal | H04L 51/04 |
| 2018/0375676 A1* | 12/2018 | Bader-Natal | G06F 3/0481 |
| 2020/0342415 A1* | 10/2020 | Han | G06Q 10/101 |

FOREIGN PATENT DOCUMENTS

| | | |
|---|---|---|
| CN | 105282013 A | 1/2016 |
| CN | 106571999 A | 4/2017 |
| CN | 107294843 A | 10/2017 |
| CN | 107707457 A | 2/2018 |
| CN | 111447074 A | 7/2020 |

OTHER PUBLICATIONS

The World Intellectual Property Organization (WIPO) International Search Report for PCT/CN2020/127774 dated Jan. 27, 2021 5 Pages (including translation).

* cited by examiner

REMINDER METHOD AND APPARATUS IN GROUP SESSION, DEVICE AND MEDIUM

RELATED APPLICATION(S)

This application is a continuation application of PCT Patent Application No. PCT/CN2020/127774 filed on Nov. 10, 2020, which claims priority to Chinese Patent Application No. 202010204905.6, entitled "REMINDER METHOD AND APPARATUS IN GROUP SESSION, DEVICE AND MEDIUM" filed on Mar. 22, 2020, all of which are incorporated by reference in entirety.

FIELD OF THE TECHNOLOGY

The present disclosure relates to the field of instant messaging, and in particular, to a reminder method and apparatus in a group session, a device, and a medium.

BACKGROUND

A group session is a communication method in social applications. In the group session, a group member can use a group tool as a communication tool. Group tools include: group vote, group collection, group calendar, group classroom, and the like. However, in certain existing technologies suffer drawbacks, such as inefficient in communicating a task to a group member and therefore, the group member tends to omit a to-do item in the group tool.

SUMMARY

Embodiments of the present disclosure provide a reminder method and apparatus in a group session, a device, and a medium, which can remind a group member of a to-do item in a group tool. The technical solutions are as follows:

In one aspect, the present disclosure provides a reminder method in a group session (or a reminder generation method), the method being applied to a terminal that runs an application with a group session function, the method including: displaying a group session interface of the group session, the group session being a group session in which a group member is allowed to use a group tool, the group tool being a program function that supports use by at least two group members together; displaying, in response to that the group member uses the group tool, a group tool message in the group session interface, the group tool message including an entry link of the group tool; and displaying, in response to that the group tool message is a message with a group attribute, a reminder control corresponding to the group tool in the group session interface.

In another aspect, the present disclosure provides a reminder apparatus in a group session (or a reminder generation apparatus), the reminder apparatus comprising: a memory storing computer program instructions; and a processor coupled to the memory and configured to execute the computer program instructions and perform: displaying a group session interface of a group session, the group session being a group session in which a group member is allowed to use a group tool, the group tool being a program function that supports use by at least two group members together; displaying a group tool message in the group session interface, the group tool message including an entry link of the group tool; and displaying, in response to that the group tool message is a message with a group attribute, a reminder control corresponding to the group tool in the group session interface, the reminder control being used as a reminder of an item in the group tool.

In yet another aspect, the present disclosure provides a non-transitory computer-readable storage medium storing computer program instructions executable by at least one processor to perform: displaying a group session interface of the group session, the group session being a group session in which a group member is allowed to use a group tool, the group tool being a program function that supports use by at least two group members together; displaying a group tool message in the group session interface, the group tool message including an entry link of the group tool; and displaying, in response to that the group tool message is a message with a group attribute, a reminder control corresponding to the group tool in the group session interface, the reminder control being used as a reminder of an item in the group tool.

The technical solutions provided in the embodiments of the present disclosure achieve at least the following beneficial effects:

When a group tool message is a message with a group to-do attribute, a to-do reminder control corresponding to a group tool is displayed in a group session interface, which can remind a group member in a group session of a to-do item in the group tool, thereby providing a human-computer interaction solution for effectively transmitting the group tool message to the group member. Therefore, the present disclosure prevents the group member from omitting the to-do item in the group tool when or in response to determining that the group member skips the group tool message, group messages are refreshed too fast, or there are too many group members.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
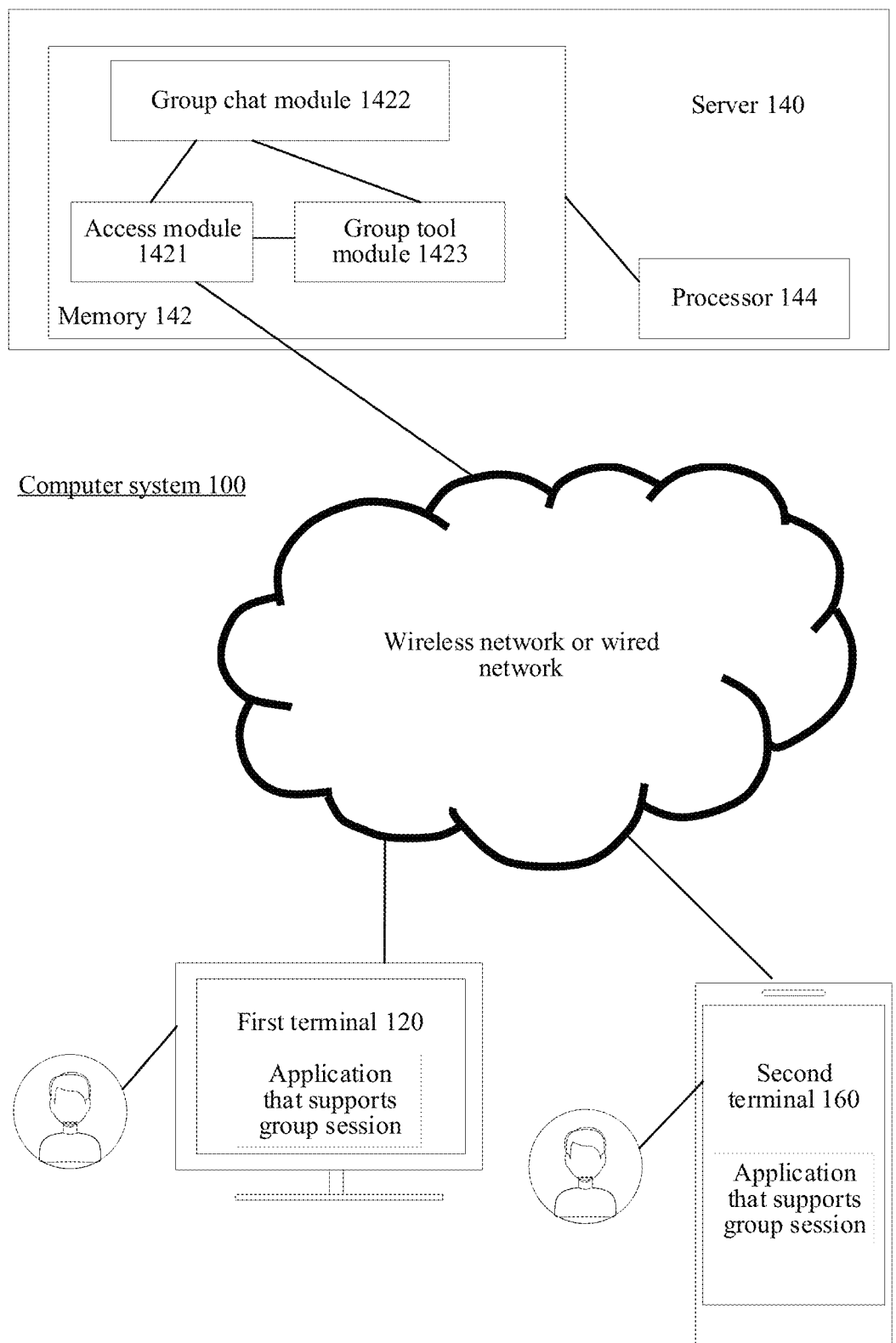
FIG. 1 is a schematic block diagram of a group session system according to embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

Group session: an instant messaging session that supports a multi-person chat in an application. Typical group sessions include, but are not limited to: a private group, a public group, a chat room, an audio and video chat room, or an online member broadcast group. In some examples, group members log in to user accounts in group sessions. In other examples, group members are allowed to use guest accounts (that is, login may not be used) to receive group messages in group sessions. The group session includes a group owner and an administrator. There is usually one group owner, and there may be a plurality of administrators.

Group tool: a program function that supports use by at least two group members together. The group tool includes, but is not limited to: at least one of a group application, a mini program, or a group notice. The group application is a native application provided for the group session in an application. The group application includes, but is not limited to: at least one of group vote, group sign-in, group activity, group video, group calendar, group call, group favorites, group live, group classroom, group collection or group notice. The mini program is a program that runs relying on an application, such as a cat hunting activity, online document statistics, a group game, and the like. The group notice is an electronic bulletin board function provided in the group session.

Group message: a message transmitted and received in a group session. The group message includes, but is not limited to: at least one of a text message, an image message, an emoticon message, a voice message, a geographic location message, a file message, a short video message, a group tool message, a system notification message, or a custom message. The text message is a message whose message content is a common text. The image message is a message whose message content is an image uniform resource locator (URL) address. The emoticon message is a message whose message content is an emoticon, a sticker, or an emoticon animation. The voice message is a message whose message content is voice data. The geographic location message is a message whose message content is information such as a geographic title, a longitude, a latitude, or the like. The file message is a message whose message content is a URL address of a file. The short video message is a message whose message content is a URL address of an audio and video file. The system notification message is a notification message transmitted by a background system to the group session. The custom message is a message customized by a developer, such as a red packet message, a rock-paper-scissors message, and the like.

Group tool message: a message generated when a group member shares a group tool or uses the group tool. The group tool message is one type of group messages.

In the related art, taking the group vote as an example, a group member A initiates a group vote in the group session, and the group vote is transmitted to the group session in the form of a group tool message. A group member B clicks on the group tool message, opens a program interface of the group vote, and completes voting. However, when there are too many group members or a message refreshing frequency is relatively high, the group tool messages are easily overwhelmed by messages refreshed later, which causes the group members to omit a to-to item in the group tool.

FIG. 1 is a structural block diagram of a computer system according to an exemplary embodiment of the present disclosure. The computer system 100 includes: a first terminal 120, a server 140, and a second terminal 160.

An application that supports a group session function is installed and run in the first terminal 120. The first terminal 120 is a terminal used by a user. In certain embodiment(s), the user uses the application by logging in to a user account. The application may be an application such as an instant messaging application, a community application, a microblog application, a short video application, an electronic commerce application, an education application, a payment application, or the like.

The first terminal 120 is connected to the server 140 by using a wireless network or a wired network.

The server 140 includes at least one of one server, a plurality of servers, a cloud computing platform, or a virtualization center. Schematically, the server 140 includes a processor 144 and a memory 142. The memory 142 further includes an access module 1421, a group chat module 1422, and a group tool module 1423. The server 140 is configured to provide a background service for an application that supports the group session function, for example, a chat access function, a group session chat function, and a group tool function. In certain embodiment(s), the server 140 takes on primary computing work, and the first terminal 120 and the second terminal 160 take on secondary computing work; alternatively, the server 140 takes on secondary computing work, and the first terminal 120 and the second terminal 160 take on primary computing work; alternatively, collaborative computing is performed by using a distributed computing architecture among the server 140, the first terminal 120, and the second terminal 160.

The second terminal 160 installs and runs an application with the group session function. The second terminal 160 is also a terminal used by the user. In certain embodiment(s), the user can use the same application on the first terminal 120 and the second terminal 160 at the same time. In certain embodiment(s), the user can transmit a target file stored in the first terminal 120 by downloading the target file in the first terminal 120 to the second terminal 160, or the second terminal 160 controls the first terminal 120 to transmit the target file.

In certain embodiment(s), applications installed on the first terminal 120 and the second terminal 160 are the same or different, or the applications installed on the two terminals are the same type of applications in different operating systems, or the applications installed on the two terminals are different applications that support information exchange. The first terminal 120 may be generally one of a plurality of terminals, and the second terminal 160 may be generally one of a plurality of terminals. In this embodiment, only the first terminal 120 and the second terminal 160 are used for description. In certain embodiment(s), device types of the first terminal 120 and the second terminal 160 are the same or different, and in the embodiments of the present disclosure, the device types of the first terminal 120 and the second terminal 160 are regarded as different for description. The device type includes at least one of a smartphone, a tablet computer, an e-book reader, a Moving Picture Experts Group Audio Layer III (MP3) player, a Moving Picture Experts Group Audio Layer IV (MP4) player, a laptop, and a desktop computer. The following embodiments are described by using an example in which the terminals include a smartphone and a personal computer.

A person skilled in the art may learn that there may be more or fewer terminals. For example, there may be only one terminal, or there may be dozens of or hundreds of terminals or more. The quantity and the device types of the terminals are not limited in the embodiments of the present disclosure.

Figure 2:
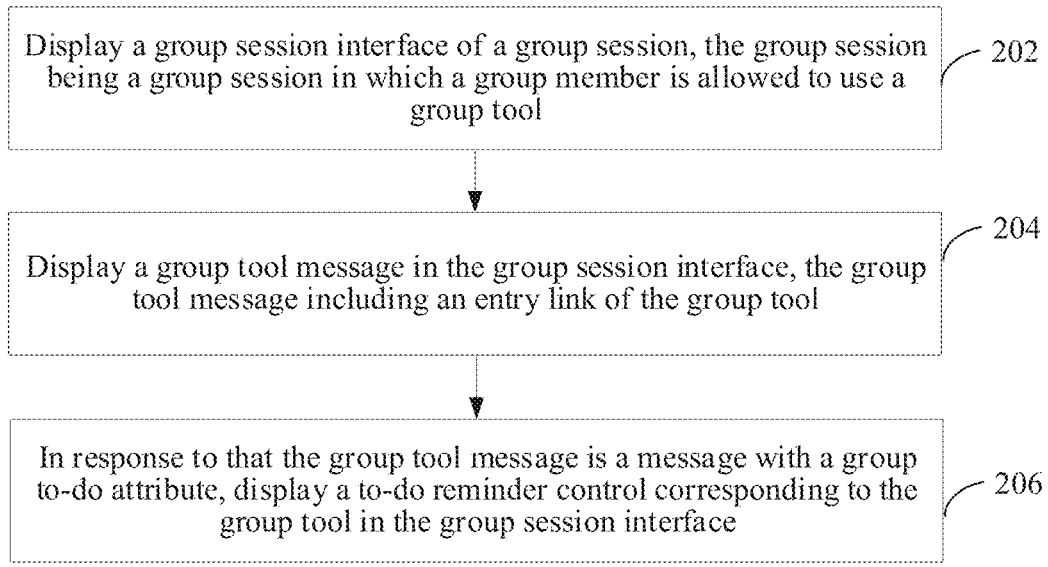
FIG. 2 is a schematic flowchart of a reminder method in a group session according to embodiment(s) of the present disclosure.

FIG. 2 is a flowchart of a reminder method in a group session according to an exemplary embodiment of the present disclosure. The present disclosure is described by using an example in which the method is applied to a terminal, and an application with a group session function is run in the terminal. The method includes:

Step 202. Display a group session interface of a group session, the group session being a group session in which a group member is allowed to use a group tool.

The group session is an instant messaging session among at least three (or between at least two) member accounts. When there are only 2 group members, the group session can be regarded as a one-to-one session. The group session interface is a user interface used for displaying a group message in the group session.

The group session is a group session in which the group member is allowed to use a group tool, the group tool being a program function that supports use by at least two group members together. The group tool includes, but is not limited to: at least one of a group application, a mini program, or a group notice. The group application is a native application provided for the group session in the application. The group application includes, but is not limited to: at least one of group vote, group sign-in, group activity, video call, group calendar, group call, group favorites, group live, group classroom, group collection or group notice. The mini program is a type of program that runs relying on the application, such as a cat hunting activity, online document statistics, a group game, and the like. The group notice is an electronic bulletin board function provided in the group session.

Schematically, the group session interface includes: a session area and a non-session area. The session area is an area used for displaying group messages. A message bubble can be used in the session area to display each group message. The non-session area is an area used for displaying group content such as an input box, a group member list, and a control button of each group session.

Step 204. Display a group tool message in the group session interface, the group tool message including an entry link of the group tool.

After a group member uses (including sharing) the group tool, a group tool message will be triggered to be generated. Each group member in the group session will receive the group tool message. The group member who uses the group tool can be at least one of a group owner, an administrator, a sharer of the group tool, a user of the group tool, a group member in another group, or a local group member. The local group member is a group member who uses a current terminal.

The application displays the group tool message in the group session interface. The group tool message includes an entry link of the group tool.

In certain embodiment(s), a display form of the group tool message is a message card on which a name of the group tool, an initiator, item content, and other information are displayed. When the message card is triggered, a tool interface of the group tool is redirected to according to the entry link of the group tool.

Step 206. In response to that the group tool message is a message with a group to-do attribute, display a to-do reminder control corresponding to the group tool in the group session interface.

In many scenarios, a to-do item in the group tool welcomes participation of all or designated group members. In this embodiment, when the group tool message is the message with the group to-do attribute, the application further displays the to-do reminder control corresponding to the group tool in the group session interface. The to-do reminder control is a control used as a reminder of the to-do item in the group tool. In certain embodiment(s), the to-do reminder control is an entry control of the group tool. The to-do reminder control is at least one of a button control, a floating layer control, a floating ball button control, or a capsule button control. In certain embodiment(s), each group tool message corresponds to a to-do reminder control, and each to-do item of the group tool corresponds to a to-do reminder control. At least one to-do reminder control is provided.

In certain embodiment(s), the term "to-do item" is interchangeable with the term "item."

In certain embodiment(s), when the group message in the session area is slid up or down, a display position of the to-do reminder control remains unchanged.

In certain embodiment(s), at least one of the following information is displayed on the to-do reminder control: an icon of the group tool; title content of the group tool; a headcount of members who have performed the to-do item of the group tool in the group session; a total headcount in the group session; and a state indicating whether a local group member has performed the to-do item of the group tool.

Figure 3:
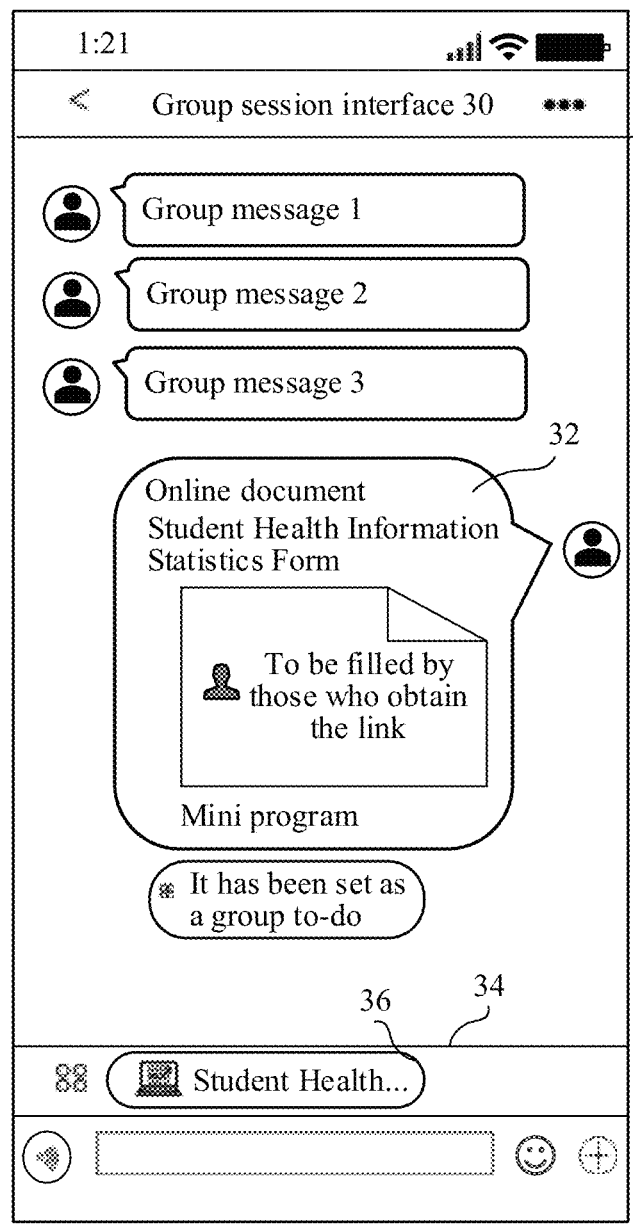
FIG. 3 is a schematic interface diagram of a reminder method in a group session according to embodiment(s) of the present disclosure.

In an example, as shown in FIG. 3, after the group member uses a group tool "online document", a group application message 32 is triggered to be generated, and the application displays the group application message 32 in a session area of a group session interface 30. The application displays a to-do reminder control in a non-session area of the group session interface 30. A to-do item bar 34 is provided at an upper edge of an input bar in the group session interface 30 (a lower edge of the session area), and a to-do reminder control 36 is displayed in the to-do item bar 34. The to-do reminder control 36 is a capsule button control, and the to-do reminder control 36 is a to-do reminder control in a shape of a capsule, which is referred to as a to-do reminder capsule or a to-do capsule for short. An icon of the group tool "online document" and title content of a to-do item "Student Health Information Statistics Form" are displayed on the to-do capsule. When there are a large number of words in the title content, the title content is truncated based on a length of the to-do reminder control, and the truncated title content is displayed on the to-do reminder control.

In certain embodiment(s), the term "to-do capsule" is interchangeable with the term "capsule."

In certain embodiment(s), the to-do reminder control is displayed on a title bar or under the title bar of the group session interface.

In another example, the application displays the to-do reminder control in the session area of the group session interface. For example, the to-do reminder control is displayed as a floating ball button control, which is displayed on a right edge of the session area.

In summary, according to the method provided in this embodiment, when a group tool message is a message with a group to-do attribute, a to-do reminder control corresponding to a group tool is displayed in a group session interface, which can remind a group member in a group session of a to-do item in the group tool, thereby providing a human-computer interaction solution for effectively transmitting the group tool message to the group member. Therefore, the present disclosure prevents the group member from omitting the to-do item in the group tool when or in response to determining that the group member skips the group tool message, group messages are refreshed too fast, or there are too many group members.

In certain embodiment(s), the term "to-do attribute" is interchangeable with the term "attribute."

When the group tool message is set to have the group to-do attribute, the application displays the to-do reminder control in the session area of the group session interface; when the group tool message does not have the group to-do attribute, the application does not display the to-do reminder control.

In certain embodiment(s), the term "to-do reminder control" is interchangeable with the term "reminder control."

In certain embodiment(s) based on FIG. 2, a group member who has authority to set the group to-do attribute can set the group to-do attribute for the group tool message. Schematically, the group member who has the authority to set the group to-do attribute is at least one of a group owner or an administrator. Alternatively, the group member who has the authority to set the group to-do attribute is at least one of the group owner, the administrator, a sharer of the group tool, an initiator of the group tool, or a group member.

In certain embodiment(s) based on FIG. 2, a setting path of the group to-do attribute includes at least two forms:

Path 1: When a group member who has the setting authority shares and uses the group tool, the group to-do attribute is set in a process of transmitting the group tool message of the group tool to the group session.

Path 2: After the group tool message of the group tool is transmitted, the group to-do attribute is set by the group member who has the setting authority.

Figure 4:
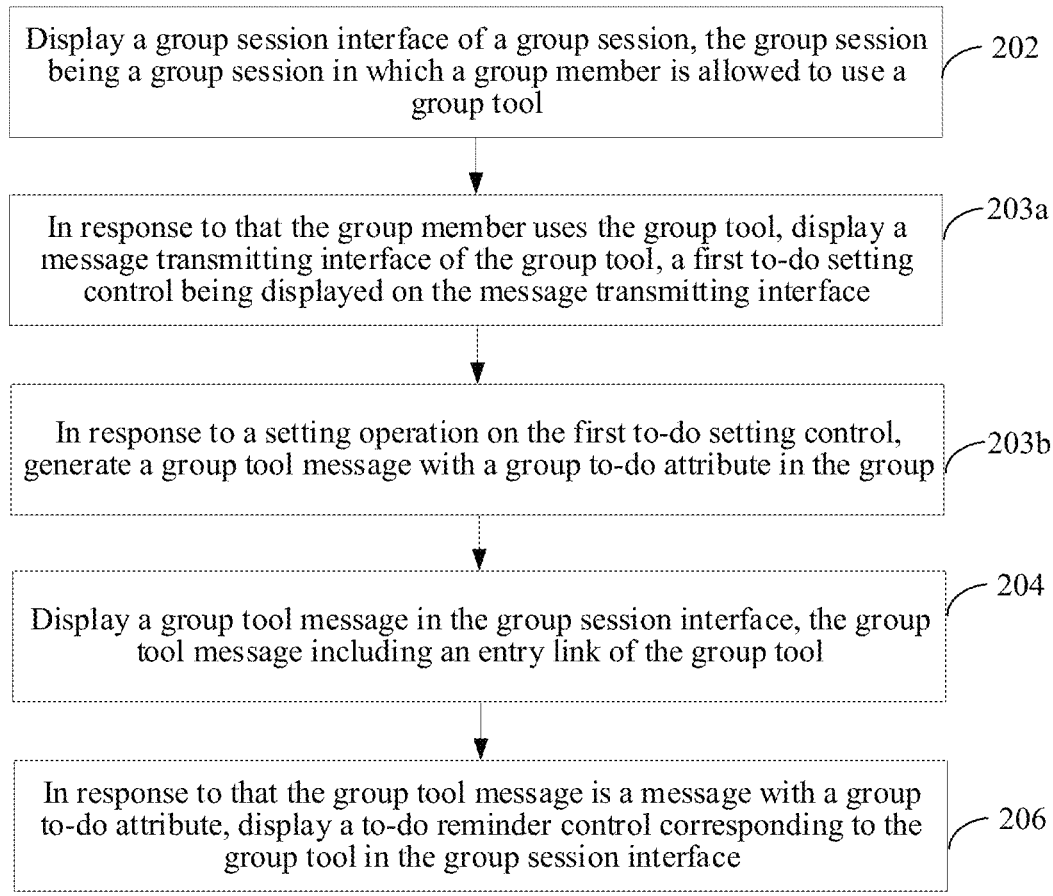
FIG. 4 is a schematic flowchart of a reminder method in a group session according to embodiment(s) of the present disclosure.

For the path 1 (main path):

In certain embodiment(s) based on FIG. 2, the method further includes step 203a and step 203b, as shown in FIG. 4:

Step 203a. In response to that the group member uses the group tool, display a message transmitting window of the group tool, a first to-do setting control being displayed in the message transmitting window.

For example, the group owner or the administrator, as an initiator of the group tool, shares the group tool in the group session. After the initiator selects the group session during the process of sharing the group tool, the message transmitting window of the group tool is displayed. A first to-do setting control is displayed in the message transmitting window, and the first to-do setting control is configured to set the group to-do attribute for the group tool message. In certain embodiment(s), the first to-do setting control is a toggle switch.

Figure 5:
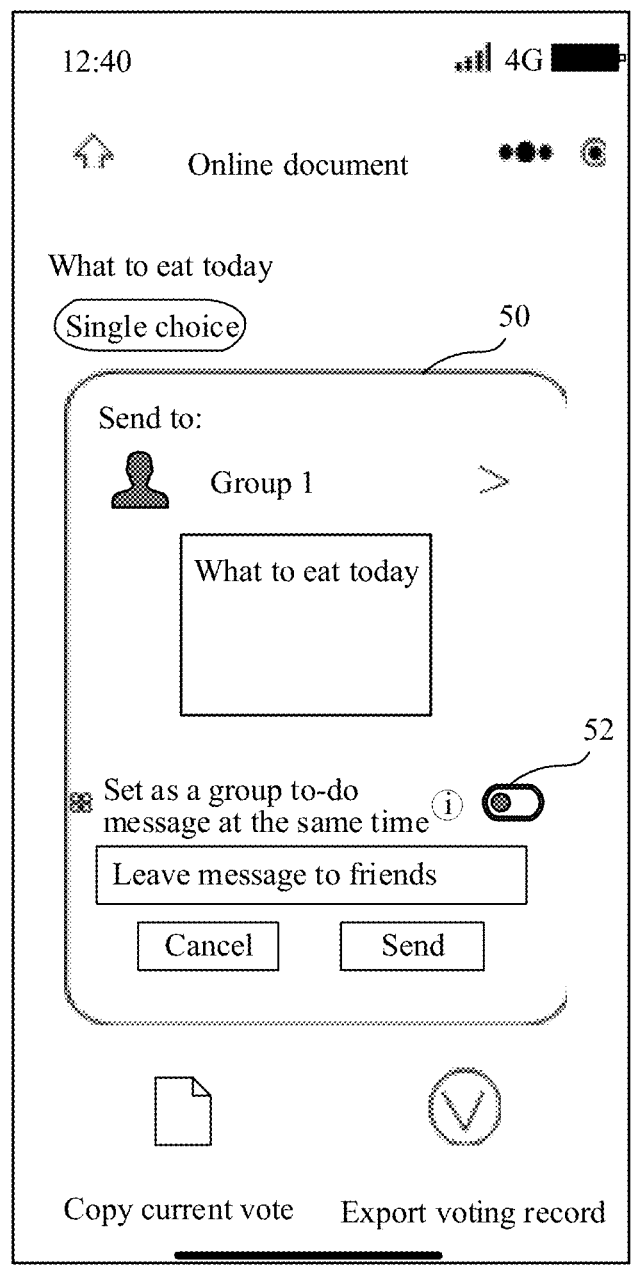
FIG. 5 is a schematic interface diagram of a reminder method in a group session according to embodiment(s) of the present disclosure.

As shown in FIG. 5, the first to-do setting control 52 is displayed in the message transmitting window 50 of the group tool "online document". A default state of the first to-do setting control 52 is an off state, that is, the group to-do attribute is not set. When a user clicks the first to-do setting control 52, the off state is switched to an on state, and the group to-do attribute is set for the group application message. Then, the user clicks a "send" button, the group application message of the group tool "online document" is transmitted to the group session, and the group application message is set to have the group to-do attribute.

In certain embodiment(s), the first to-do setting control has the following attributes:

1. By default, the first to-do setting control is turned off. That is, the group to-do attribute is not set. The initiator can manually click the first to-do setting control to switch from an off state to an on state.

Figure 6:
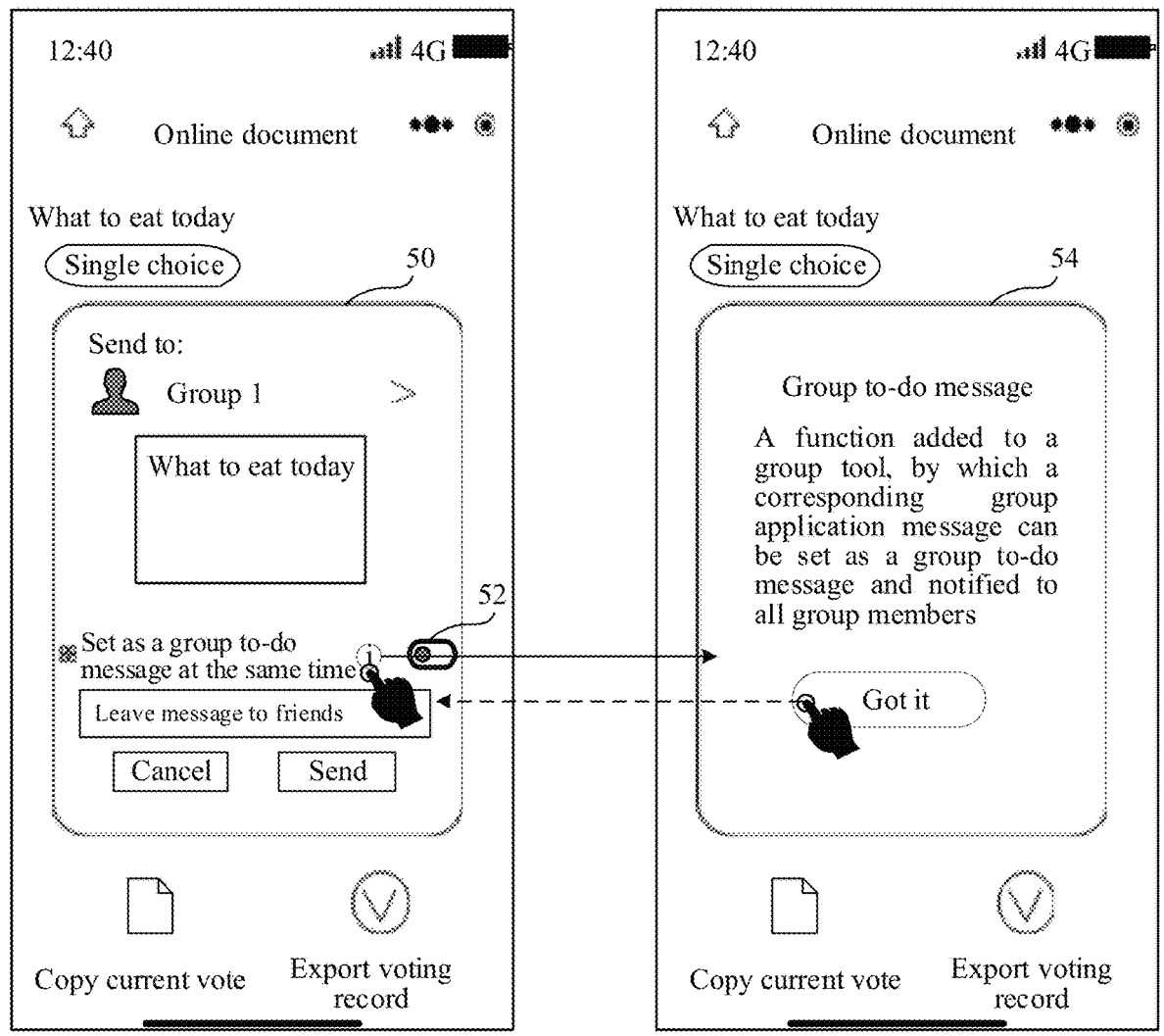
FIG. 6 is a schematic interface diagram of a reminder method in a group session according to embodiment(s) of the present disclosure.

2. When or in response to determining that a group to-do message function is used for the first time, a user education window of the group to-do message function is first displayed, to introduce a method of using the group to-do message function to the user. As shown in FIG. 6, when the group to-do message function is used for the first time, the user education window 54 in which the group to-do message function is displayed will pop up. When the group to-do message function is subsequently used, the user education window 54 will also be displayed when the user clicks an i button.

3. If the initiator selects a plurality of group sessions to share the group tool, the first to-do setting control will not be displayed in the message transmitting window of the group tool.

Step 203b. In response to a setting operation on the first to-do setting control, transmit the group tool message with the group to-do attribute.

The setting operation includes, but is not limited to: a single-click operation, a double-click operation, a toggle sliding operation, and so on.

When the user clicks the first to-do setting control, the group tool message is set to be the group tool message with the group to-do attribute, which is referred to as a group to-do message for short. After the user clicks the "send" button, the group to-do message is transmitted to group members in the group session.

For example, after the group tool message is transmitted, the to-do reminder control appears above input boxes of the group members (including the initiator). At the same time, a prompt message is displayed on the periphery of the group tool message: It has been set as a group to-do. The prompt message is displayed in a green light-on state.

In certain embodiment(s), when the group tool is a group notice, the words "group notice" instead of content of the group notice is displayed on the to-do reminder.

The group tool message being transmitted to the group members is used as an example for description above. In certain embodiments, the initiator may select some designated group members in the group session, and transmit the group tool message with the group to-do attribute to the designated group members. The group tool message may not be transmitted to non-designated group members in the group session, or the group tool message without the group to-do attribute may be transmitted to the non-designated group members in the group session. In this way, the to-do reminder control (a to-do capsule) will be displayed on the application used by the designated group members, and the to-do reminder control will not be displayed on the application used by the non-designated group members.

Methods for selecting the designated group members by the initiator include, but are not limited to: a list control selection method before the message is transmitted, and a method of @ designated members in message content.

Figure 7:
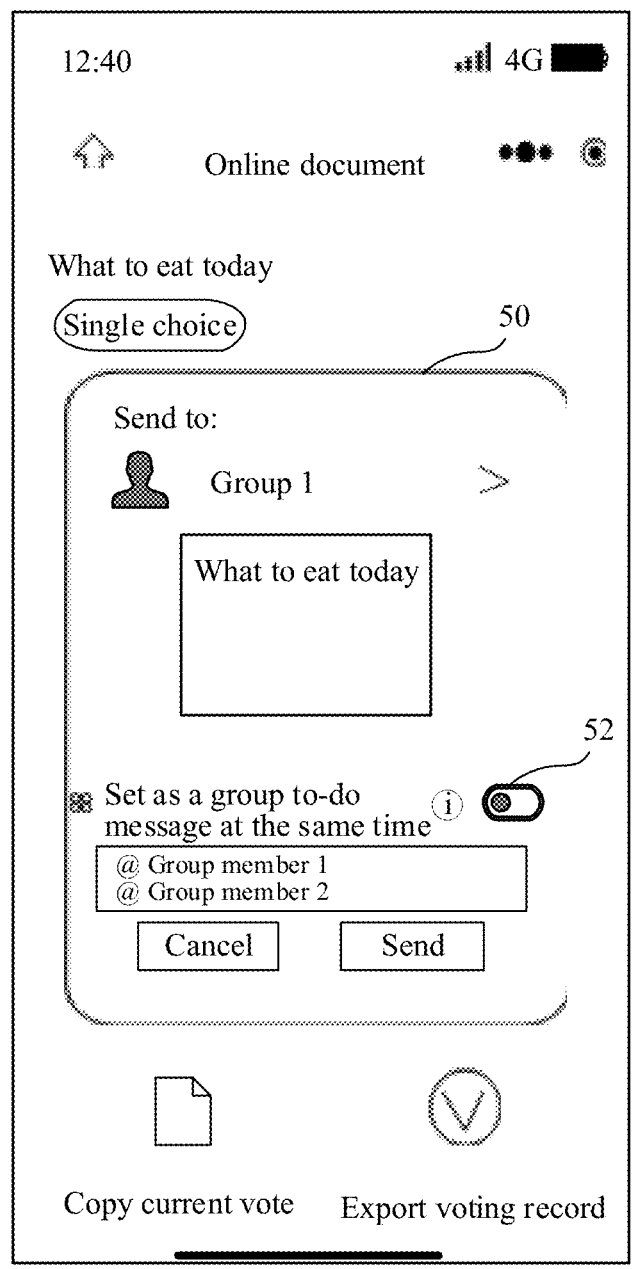
FIG. 7 is a schematic interface diagram of a reminder method in a group session according to embodiment(s) of the present disclosure.

In an example, as shown in FIG. 7, the initiator selects a group member 1 and a group member 2 in the message transmitting window of the group tool message by using the method of "@ designated members". A server transmits a group tool message with the group to-do attribute to the group member 1 and the group member 2, and transmits a group tool message without the group to-do attribute to other group members except the group member 1 and the group member 2.

In summary, according to the method provided in this embodiment, an initiator sets a group tool message as a group to-do message during the process of transmitting the group tool message of a group tool to a group session, which is convenient for the initiator to complete setting of the group to-do attribute when using the group tool message, thereby increasing smoothness and convenience of user operations.

Figure 8:
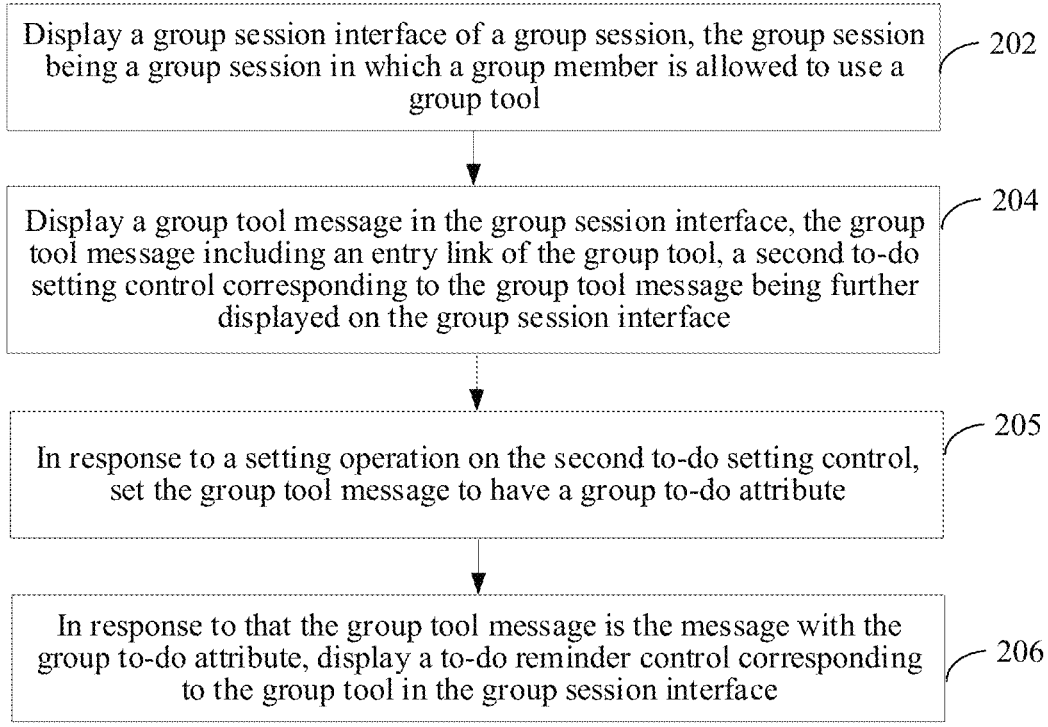
FIG. 8 is a schematic flowchart of a reminder method in a group session according to embodiment(s) of the present disclosure.

For the path 2 (a compensation path):

In certain embodiment(s) based on FIG. 2, a second to-do setting control corresponding to the group tool message is further displayed on the group session interface, and the method further includes step 205, as shown in FIG. 8:

Step 205. In response to a setting operation on the second to-do setting control, set the group tool message to have the group to-do attribute.

The second to-do setting control is displayed in the session area. For example, the second to-do setting control is displayed on the periphery of the group tool message. For example, the second to-do setting control is displayed in an area below the group tool message. The distance between the second to-do setting control and the message card of the group tool message is a predetermined distance, the predetermined distance being less than or equal to an interval distance between adjacent message bubbles.

Figure 9:
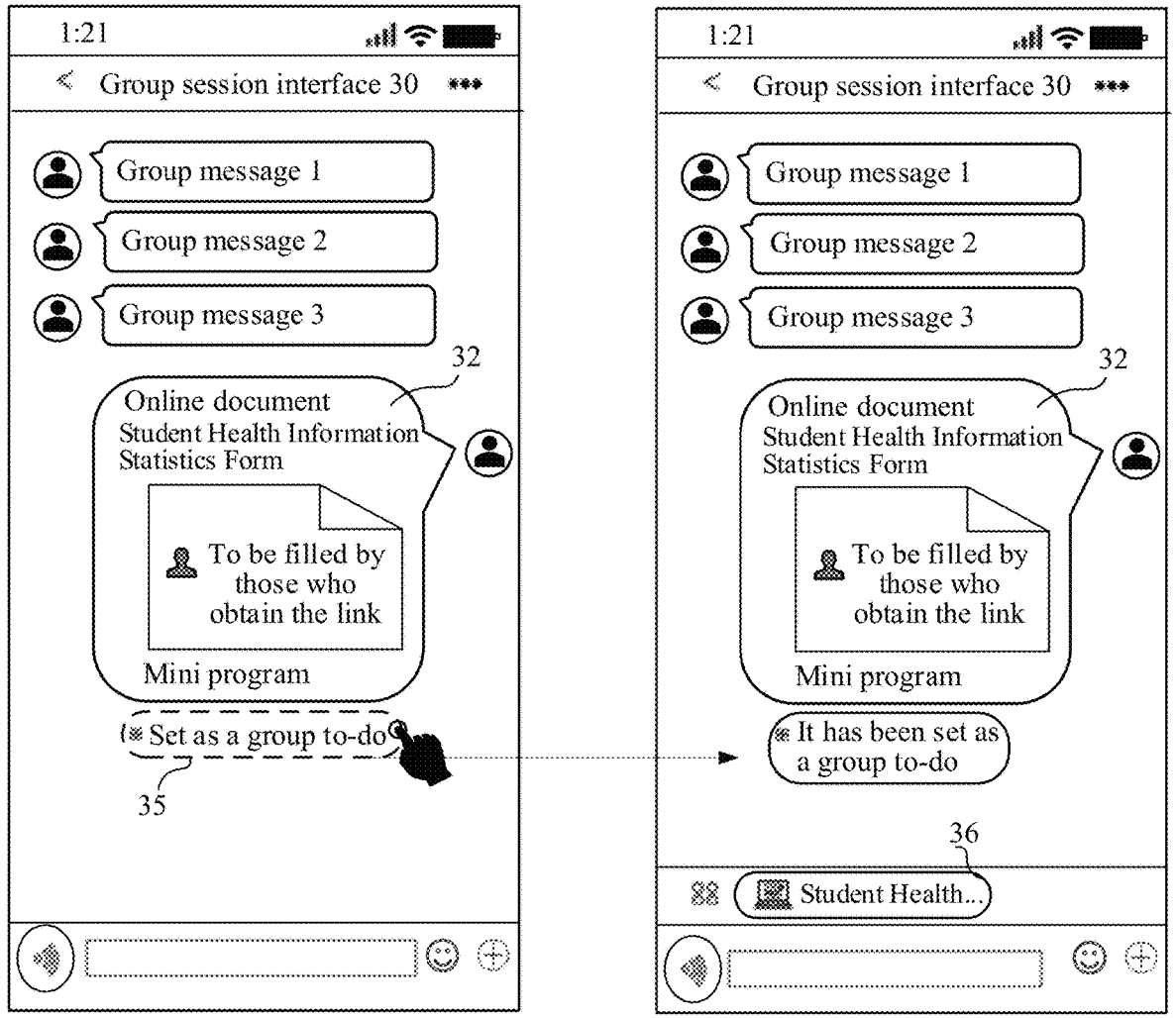
FIG. 9 is a schematic interface diagram of a reminder method in a group session according to embodiment(s) of the present disclosure.

As shown in FIG. 9, after a group member who has usage authority shares or uses a group tool "online document", a group tool message 32 of the "online document" is displayed on a group session interface 30, and a second to-do setting control 35 is displayed below the group tool message 32. In an initial state, the second to-do setting control 35 does not have a group to-do, and a prompt text "Set as group to-do" is displayed on the second to-do setting control 35. When the user clicks the second to-do setting control 35, the group to-do attribute is set for the group tool message 32. The prompt text on the second to-do setting control 35 is switched from "Set as group to-do" to "It has been set as group to-do".

Figure 10:
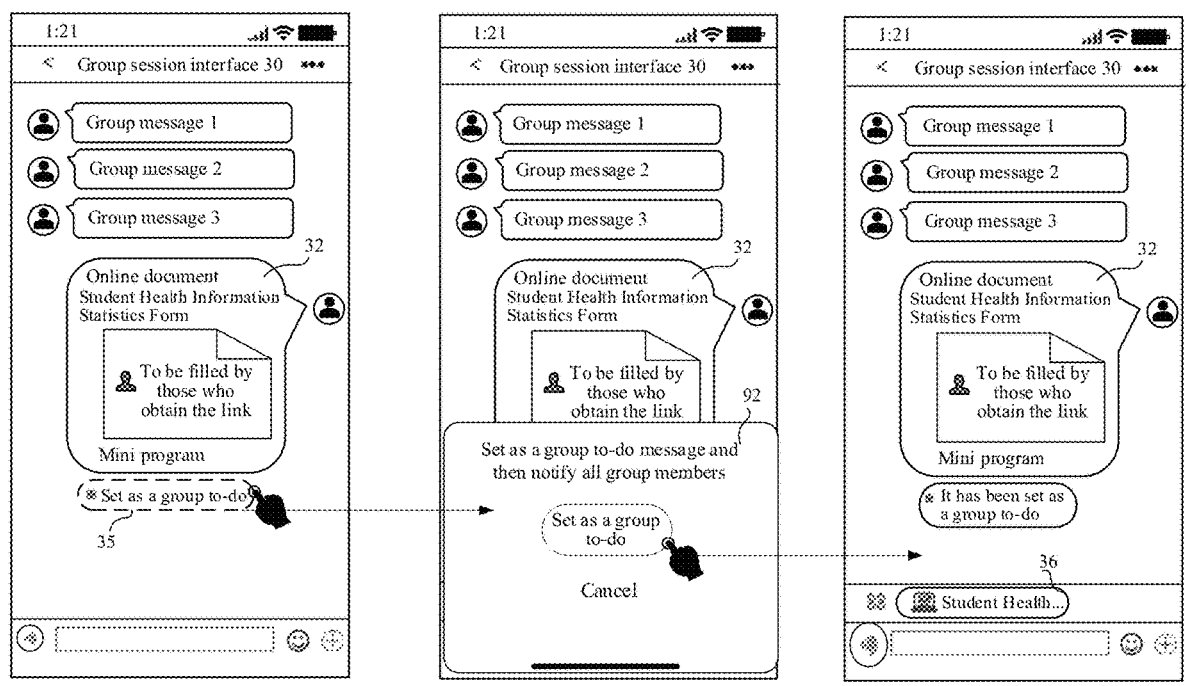
FIG. 10 is a schematic interface diagram of a reminder method in a group session according to embodiment(s) of the present disclosure.

In certain embodiment(s), when the second to-do setting control 35 is clicked for the first time, a user education window 92 will pop up on the group session interface 30 to introduce a method of using the group to-do message function to the user, as shown in FIG. 10.

In certain embodiment(s), when the second to-do setting control 35 is clicked, a group member selection list pops up, and a designated group member is selected through a selection list control. The server transmits the group tool message with the group to-do attribute to the designated group member, and transmits the group tool message without the group to-do attribute to other group members except the designated group member.

In summary, according to the method provided in this embodiment, a group tool message is set as a group to-do message after the group tool message is generated, which is convenient for a group owner and an administrator to complete setting of the group to-do attribute in a subsequent process of using the group tool, thereby increasing smoothness and convenience of user operations.

Function of Displaying a Real-Time Headcount of the Group to-do

Figure 11:
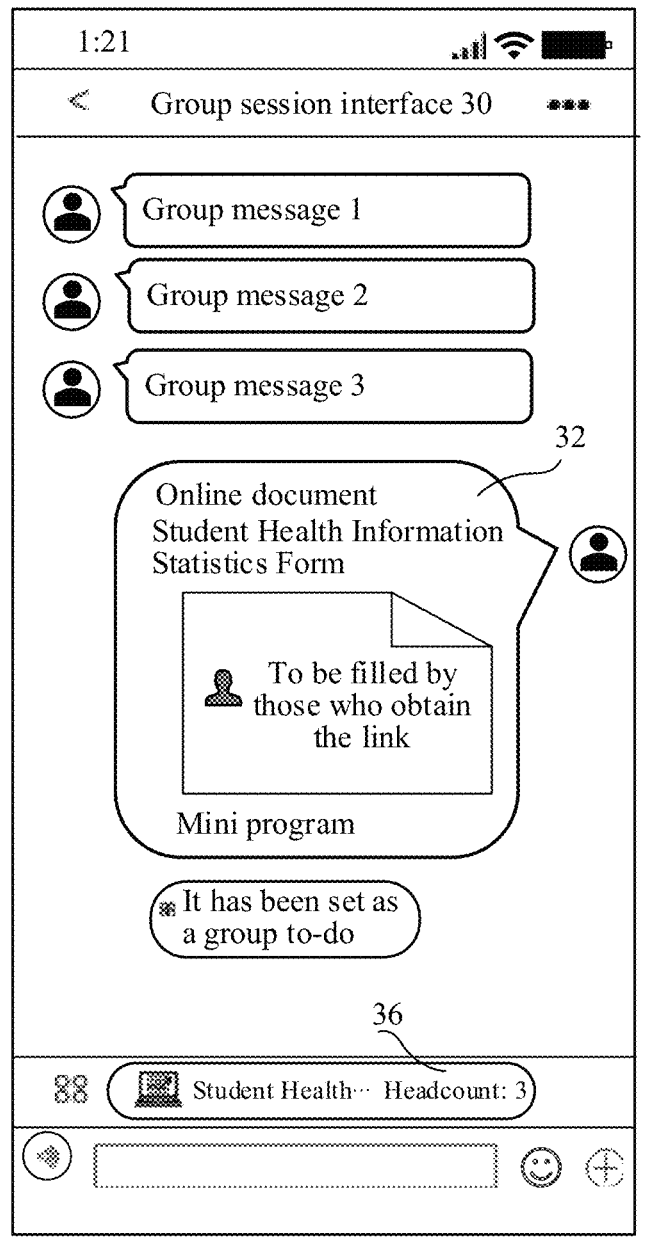
FIG. 11 is a schematic interface diagram of a reminder method in a group session according to embodiment(s) of the present disclosure.

In certain embodiment(s) based on the FIG. 2, the to-do reminder control supports displaying a headcount of group members who have performed the to-do item. The headcount of the group members can be displayed all the time or only in certain time periods. As shown schematically in FIG. 11, after the to-do reminder control 36 is displayed on the group session interface 30, if a local group member has not performed the to-do reminder control, the headcount "3" of group members who have performed the to-do item is displayed on the to-do reminder control 36. In certain embodiment(s), the headcount of group members does not support a single click, and cannot be truncated.

In summary, according to the method provided in this embodiment, the headcount of group members who have performed the to-do item is displayed on the to-do reminder control, which enables the group members to view the progress of the to-do item in the group tool without redundant operations, thereby improving efficiency of information acquisition.

Function of Completing the to-do Item

Figure 12:
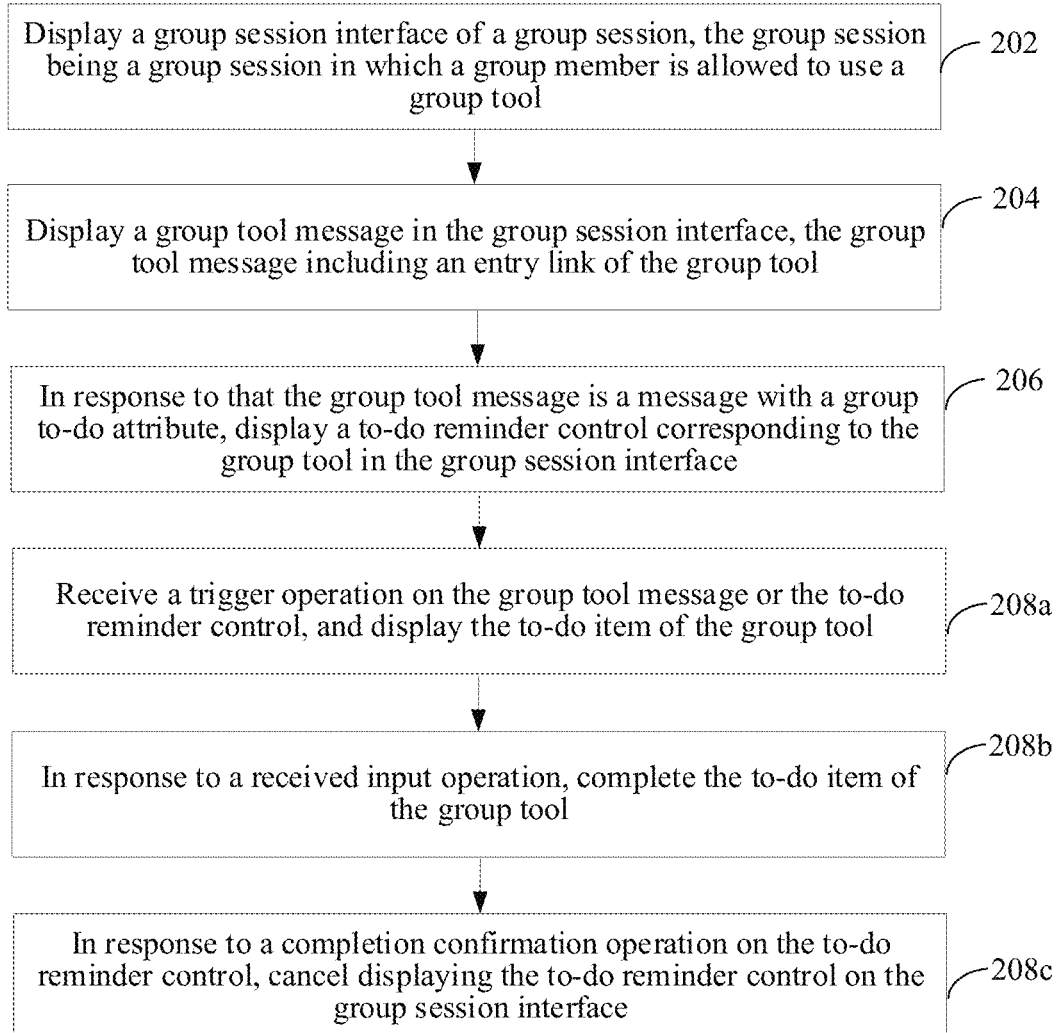
FIG. 12 is a schematic flowchart of a reminder method in a group session according to embodiment(s) of the present disclosure.

In certain embodiment(s) based on FIG. 2, the method further includes step 208*a*, step 208*b* and step 208*c*, as shown in FIG. 12:

Step 208*a*. Receive a trigger operation on the group tool message or the to-do reminder control, and display the to-do item of the group tool.

The trigger operation includes, but is not limited to: at least one of a single-click operation, a double-click operation, a physical button operation, or a voice output operation.

After the user clicks the group tool message or the to-do reminder control, the user is redirected to the tool interface of the group tool from the group session interface, the to-do item of the group tool being displayed on the tool interface.

For example, the group tool is an online document, document editing content of the online document is displayed on the tool interface, and the user completes editing of the online document on the tool interface.

Step 208*b*. In response to a received input operation, complete the to-do item of the group tool.

In response to the received input operation on the tool interface, a local group member completes the to-do item in the group tool.

Figure 13:
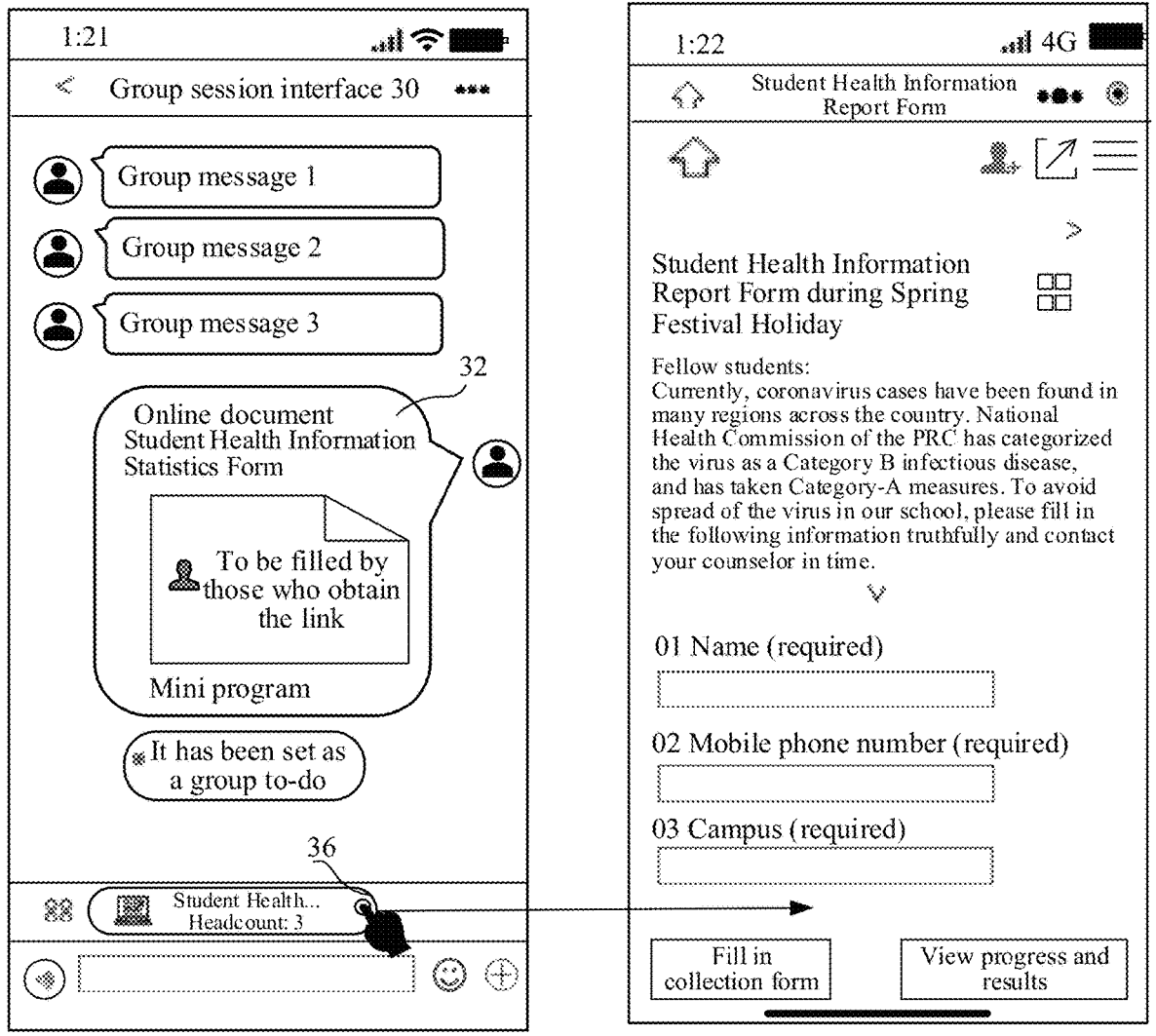
FIG. 13 is a schematic interface diagram of a reminder method in a group session according to embodiment(s) of the present disclosure.

For example, as shown in FIG. 13, after the local group member clicks the to-do reminder control 36, the to-do item of the group tool is triggered to be performed.

Step 208*c*. In response to a completion confirmation operation on the to-do reminder control, cancel displaying the to-do reminder control.

The completion confirmation operation may be an operation of clicking a completion prompt on the to-do reminder control.

Figure 14:
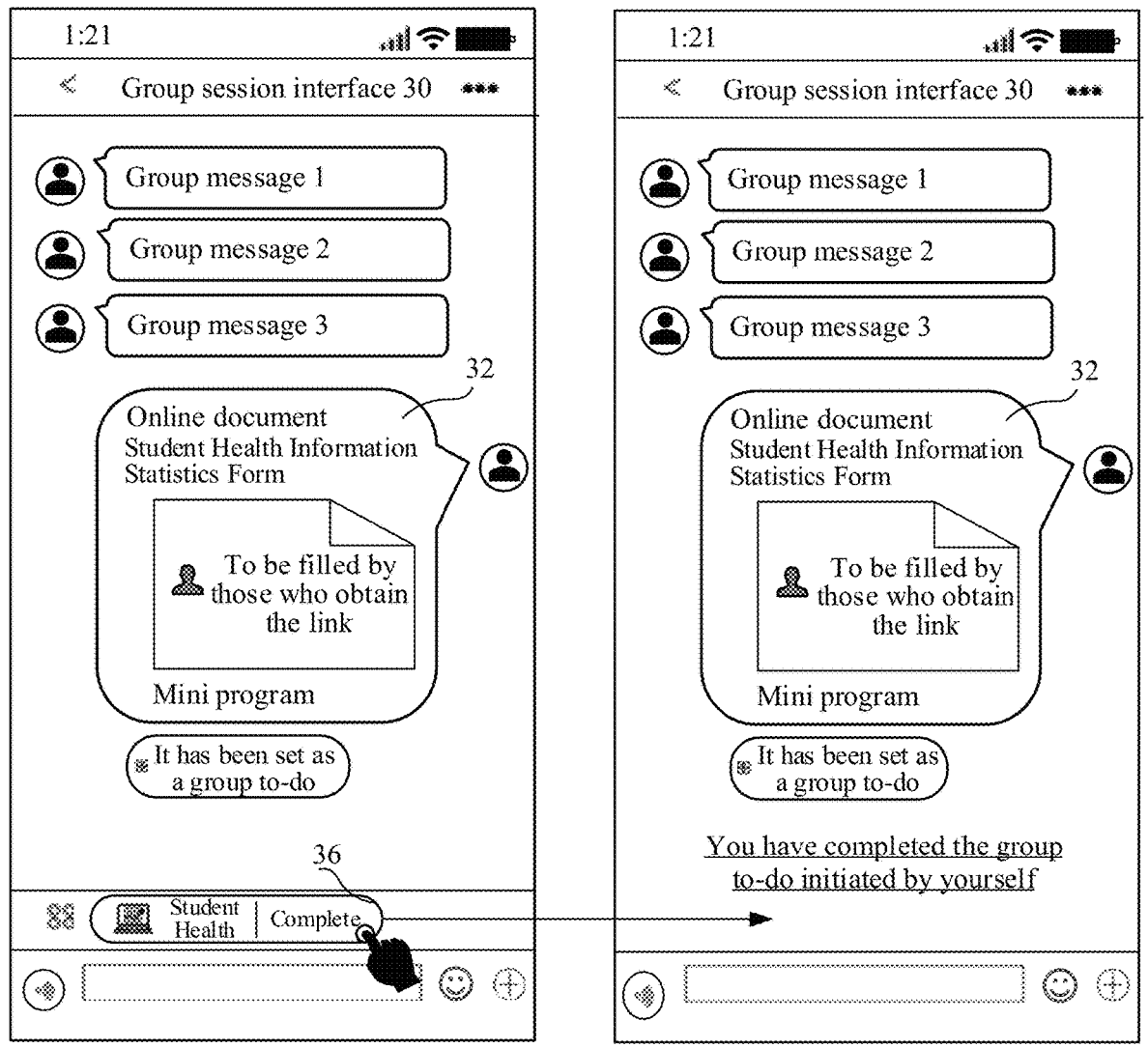
FIG. 14 is a schematic interface diagram of a reminder method in a group session according to embodiment(s) of the present disclosure.

As shown schematically in FIG. 14, after the user completes the to-do item in the group tool, a "complete" prompt appears at the end of the to-do capsule. The "complete" prompt can replace the headcount of group members who have performed the to-do item on the to-do reminder control. At the same time, the to-do capsule is updated be located on the leftmost side of a to-do item bar. After the user clicks the "complete" prompt on the to-do capsule 36, the to-do reminder control on the group session interface 30 is canceled.

At the same time, the completion confirmation operation will trigger a system notification message "You have performed the group to-do" or "You have performed the group to-do initiated by yourself" (for the initiator).

In summary, according to the method provided in this embodiment, a task cancelling function is provided on the to-do reminder control, which enables group members to cancel the to-do reminder control in time after completing the task, thereby providing a set of lightweight "to-do" task management functions on the group session interface.

Function of Deleting the to-do Reminder Control

Figure 15:
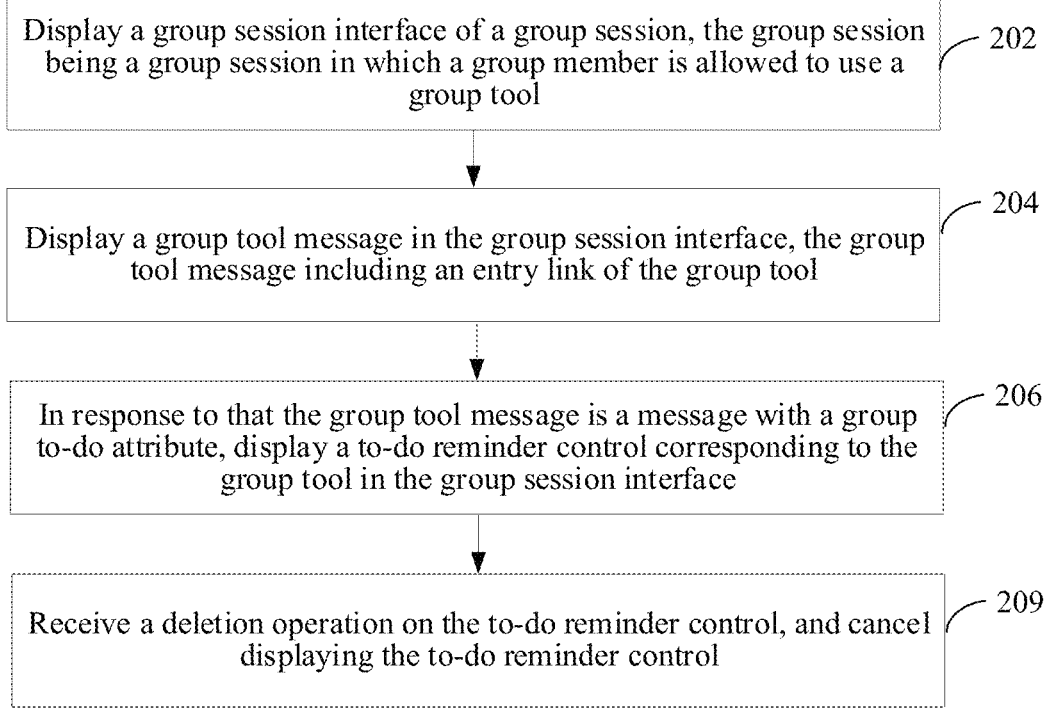
FIG. 15 is a schematic flowchart of a reminder method in a group session according to embodiment(s) of the present disclosure.

In certain embodiment(s) based on FIG. 2, as shown in FIG. 15, the method further includes:

Step 209. Receive a deletion operation on the to-do reminder control, and cancel displaying the to-do reminder control.

For example, the deletion operation includes: a long-press operation on the to-do reminder control, and a click operation on the pop-up deletion button.

Regardless of whether the to-do item corresponding to the to-do reminder control is in a performed state or in an un-performed state, the deletion operation can be used for deleting the item.

Figure 16:
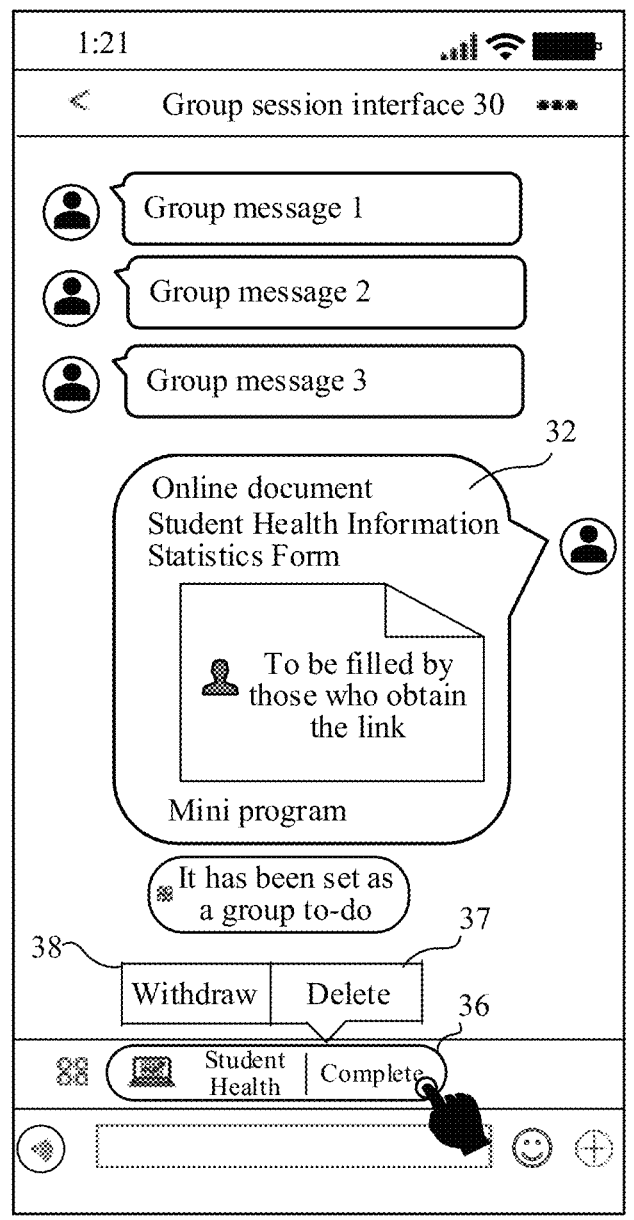
FIG. 16 is a schematic interface diagram of a reminder method in a group session according to embodiment(s) of the present disclosure.

As shown schematically in FIG. 16, a long press operation is performed by any group member on the to-do reminder control 36 on the group session interface. A deletion button 37 is displayed above the to-do reminder control 36. After the group member clicks the deletion button 37, the application cancels displaying the to-do reminder control 36.

In certain embodiment(s), for the un-performed to-do reminder control, in response to timeout of a timer that starts at a moment when the to-do reminder control is generated (for example, 7 days), displaying of the to-do reminder control is automatically canceled. Alternatively, in response to that a total quantity of the to-do reminder controls exceeds a threshold, displaying of a to-do reminder controls that is generated earliest and causes the total quantity to exceed the threshold is automatically canceled.

In summary, according to the method provided in this embodiment, a deletion function for a to-do reminder control is provided, which enables a group member to delete a to-do reminder control in which the group member is not interested, thereby avoiding interruption of invalid information.

A Withdrawal Function of the to-do Reminder Control

Figure 17:
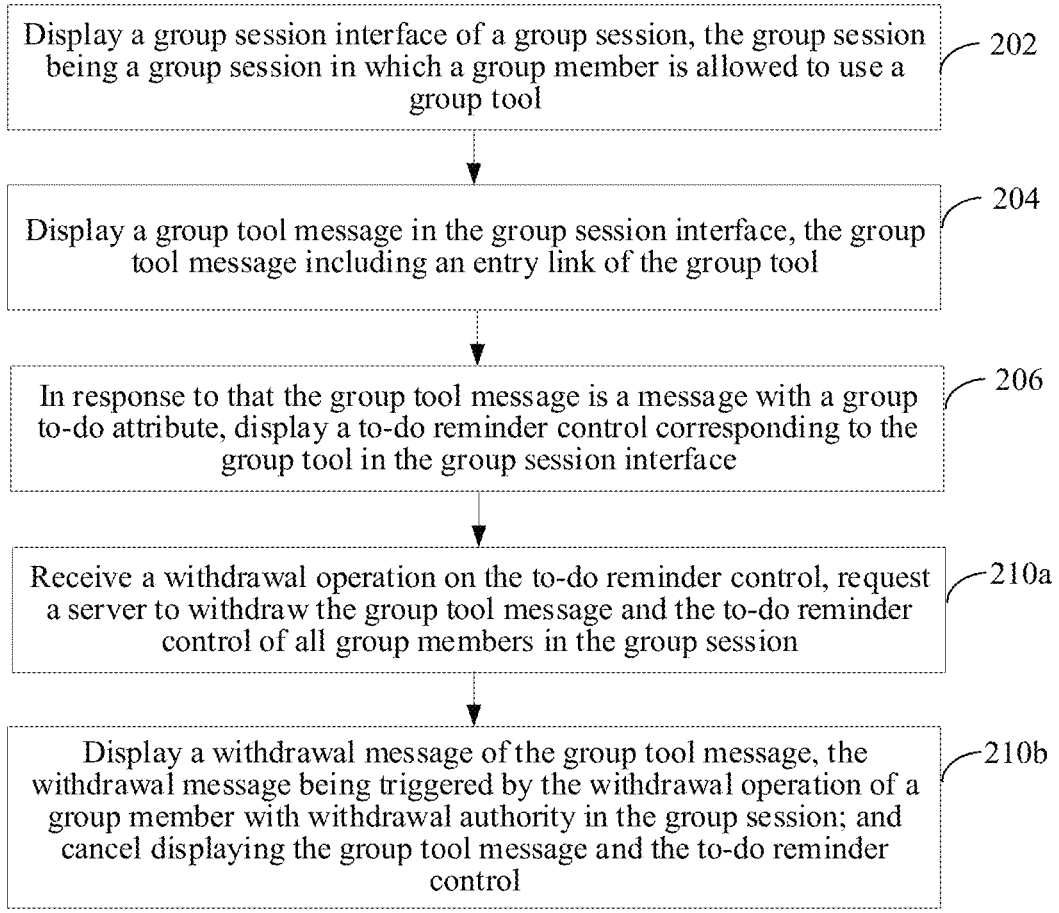
FIG. 17 is a schematic flowchart of a reminder method in a group session according to embodiment(s) of the present disclosure.

In certain embodiment(s) based on FIG. 2, as shown in FIG. 17, the method further includes:

Step 210*a*. Receive a withdrawal operation on the to-do reminder control, and request a server to withdraw the group tool message and the to-do reminder control of group members in the group session.

A group member who has withdrawal authority, such as a group owner, an administrator, or a publisher, can trigger the withdrawal operation on the to-do reminder control. For example, the withdrawal operation includes: a long-press operation on the to-do reminder control, and a click operation on the pop-up withdrawal button.

In an alternative implementation, a withdrawal operation on a second to-do setting control is received, and a server is requested to withdraw the group tool message and the to-do reminder control of group members in the group session.

As shown schematically in FIG. 16, a long press operation is performed by any group member on the to-do reminder control 36 on the group session interface. A withdrawal button 38 is displayed above the to-do reminder control 36. After the group member clicks the withdrawal button 38, the application cancels displaying the to-do reminder control 36.

At the same time, after a group member who has withdrawal authority withdraws the to-do reminder control 36, the following steps are further performed for other group members:

Step 210*b*. Display a withdrawal message of the group tool message, the withdrawal message being triggered by the withdrawal operation of a group member with withdrawal authority in the group session; and cancel displaying the group tool message and the to-do reminder control.

In an example, an administrator long-presses a to-do capsule (initiated by any group member), clicks the withdrawal button 38 to cancel displaying the to-do capsule, and triggers a system message: You have withdrawn a group to-do.

Other group members are shown with: xxx (administrator) has withdrawn a group to-do.

In certain embodiment(s), the withdrawal is valid within 7 days, and there will be no withdrawal button after 7 days.

Figure 18:
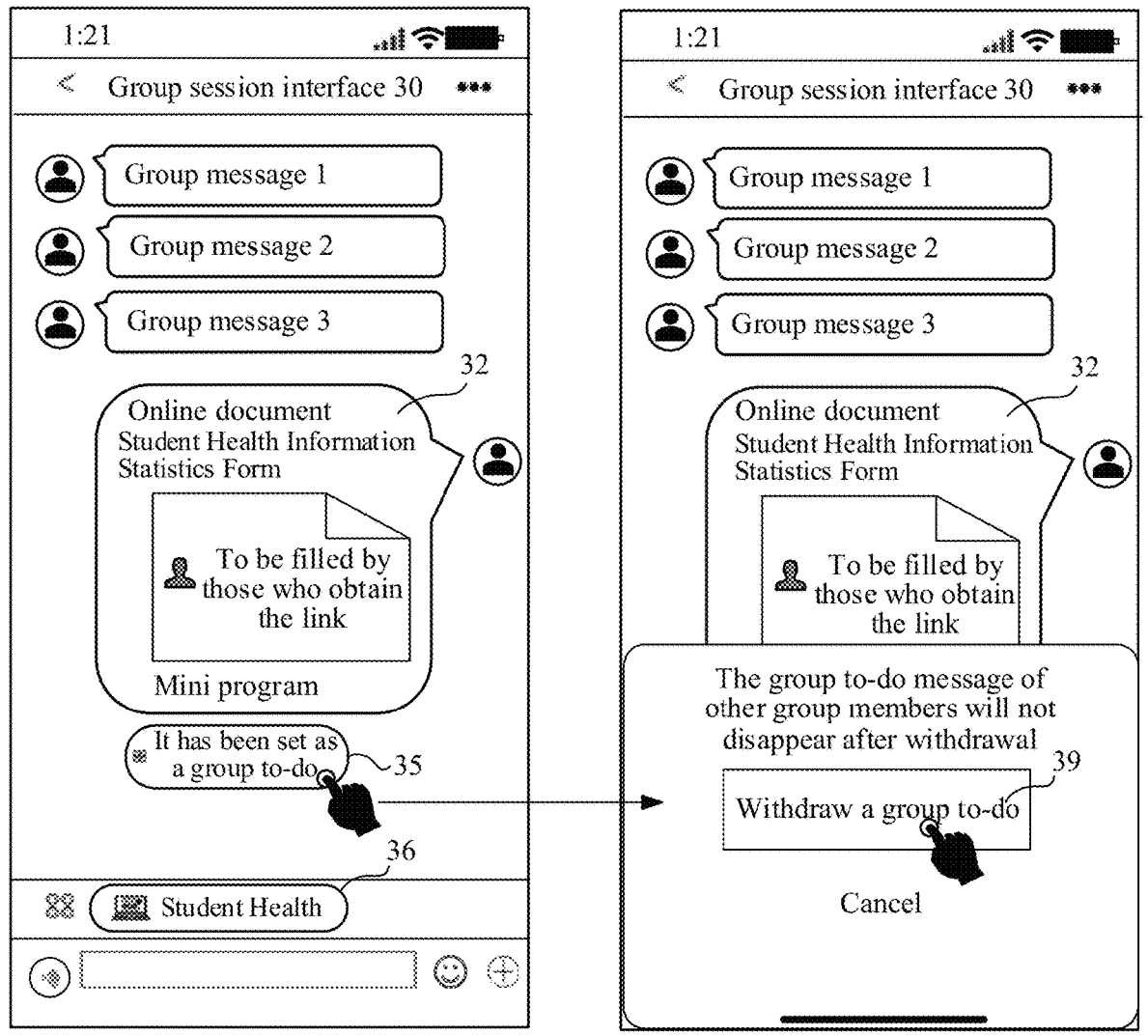
FIG. 18 is a schematic interface diagram of a reminder method in a group session according to embodiment(s) of the present disclosure.

In another example, as shown in FIG. 18, the administrator clicks the second to-do setting control 35, and a withdrawal action menu (actionsheet) pops up for second confirmation. After the group to-do 39 is clicked to be withdrawn, displaying of the to-do capsule is canceled and a system message is triggered at the same time: You have withdrawn a group to-do.

Other group members are shown with: xxx (administrator) has withdrawn a group to-do.

In certain embodiment(s), the withdrawal is valid within 7 days, and there will be no withdrawal button after 7 days.

In another example, the publisher long-presses the group tool message and clicks to withdraw (2-minute logic), then the group to-do capsule will be withdrawn in an associated manner, and the system message will be triggered at the same time: You have withdrawn a message.

Other users are shown with: xxx (publisher) has withdrawn a message.

In summary, according to the method provided in this embodiment, a withdrawal function of a to-do item is provided for a group member who has administration authority, which enables the group member to withdraw a group to-do item and a to-do reminder control according to actual conditions, thereby avoiding interruption of invalid information.

In a schematic example, the logic of the system messages includes:
Role
Behavior
Receiver
Message
//Remarks 1. When the publisher shares or uses the group tool, a system message in the following form is triggered:
   creator (sender)
      share a message
      withdraw a message 2. When the administrator sets the group to-do attribute for the group tool message, a system message in the following form is triggered:
   manager (administrator)
      set to-do
         creator // It may be desirable to distinguish whether the creator is the manager, and this message is not displayed when the creator is the manager
         $manager$ set your message as a group to-do 3. When the administrator withdraws the to-do item, a system message in the following form is triggered:
   withdraw to-do
      all // It may be desirable to distinguish whether the to-do item is withdrawn by the administrator, and if yes: You have withdrawn a group to-do
      $manager$ has withdrawn a group to-do 4. When the group member cancels the to-do item, a system message in the following is triggered:
   receiver (member who clicks "complete")
      complete
         receiver // It may be desirable to distinguish whether the receiver is the group member, and if yes: You have performed a group to-do published by yourself
         you have performed a group to-do published by $creator$ [client pop-up]
         creator, manager //receiver=creator, only system messages of the receiver are displayed
         $receiver$ has performed $title$ //title Blue and clickable, with a space in front
         //These system messages are visible to the group members, and users except the manager and the creator will no longer receive these system messages after clicking "complete".

For a scenario where the group tool is a group notice, the following logic can be provided:

1. The administrator edits the group notice, and after the administrator clicks to publish the group notice, a group notice message of @all will be transmitted in the group (original logic).

2. A gray tail is added under the group notice message. If the group administrator clicks the gray tail, a to-do item of the group notice will be triggered through path 2.

3. The group notice is updated, a to-do reminder control of a historical group notice is deleted, a gray tail appears on the latest group notice, and a second to-do setting control on the historical group notice message disappears.

4. Only the words "group notice" are displayed on the to-do reminder control of the group notice and content of the group notice is not displayed.

The method embodiments can be freely combined for implementation, which is not limited in the present disclosure.

Figure 19:
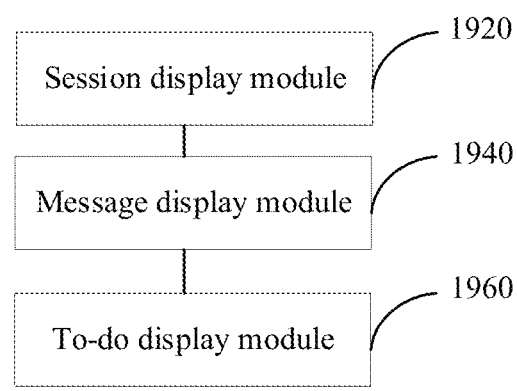
FIG. 19 is a schematic structural block diagram of a reminder apparatus in a group session according to embodiment(s) of the present disclosure.

FIG. 19 is a block diagram of a reminder apparatus in a group session according to an exemplary embodiment of the present disclosure. The apparatus has a group session function. The apparatus includes: a session display module 1920, configured to display a group session interface of a group session, the group session being a group session in which a group member is allowed to use a group tool, the group tool being a program function that supports use by at least two group members to use together; a message display module 1940, configured to display a group tool message in the group session interface, the group tool message including an entry link of the group tool; and a to-do display module 1960, configured to display, in response to that the group tool message is a message with a group to-do attribute, a to-do reminder control corresponding to the group tool in the group session interface, the to-do reminder control being used as a reminder of a to-do item in the group tool.

In certain embodiment(s), the term "to-do display module" is interchangeable with the term "display module."

In certain embodiment(s), the group session interface includes: a session area and a non-session area, the session area being an area used for displaying a group message; and the displaying a to-do reminder control corresponding to the group tool in the group session interface includes: displaying the to-do reminder control in the non-session area of the group session interface.

In certain embodiment(s), the to-do reminder control in a shape of a capsule is displayed in the non-session area of the group session interface.

In certain embodiment(s), at least one of the following information is displayed on the to-do reminder control: an icon of the group tool; title content of the group tool; a headcount of members who have performed the to-do item of the group tool in the group session; a total headcount in the group session; and a state indicating whether a local group member has performed the to-do item of the group tool.

In certain embodiment(s), the message display module 1940 is configured to display, in response to that the group member uses the group tool, a message transmitting window of the group tool, a first to-do setting control being displayed in the message transmitting window; and generate, in response to a setting operation on the first to-do setting control, the group tool message with the group to-do attribute.

In certain embodiment(s), a second to-do setting control corresponding to the group tool message is further displayed on the group session interface. The to-do display module 1960 is configured to set, in response to a setting operation on the second to-do setting control, the group tool message to have the group to-do attribute.

In certain embodiment(s), the to-do display module 1960 is configured to receive a trigger operation on the group tool message or the to-do reminder control, and display the to-do item of the group tool; and cancel, in response to a completion confirmation operation on the to-do reminder control, displaying the to-do reminder control.

In certain embodiment(s), the to-do display module 1960 is configured to receive a deletion operation on the to-do reminder control and cancel displaying the to-do reminder control; or, in response to timeout of a timer that starts at a moment when the to-do reminder control is generated, cancel displaying the to-do reminder control; or, in response to that a total quantity of the to-do reminder controls exceeds a threshold, cancel displaying a to-do reminder control that is generated earliest and causes the total quantity to exceed the threshold.

In certain embodiment(s), the to-do display module 1960 is configured to, in response to a withdrawal operation on the to-do reminder control, request a server to withdraw the group tool message and the to-do reminder control of group members in the group session; or, display a withdrawal message of the group tool message, the withdrawal message being triggered by the withdrawal operation of a group member with withdrawal authority in the group session; and cancel displaying the group tool message and the to-do reminder control.

In certain embodiment(s), the group tool further includes at least one of the following: a group application; a mini program that runs relying on the application; and a group notice.

The reminder apparatus in a group session provided in the embodiments is illustrated with an example of division of the functional modules. In implementation, the functions may be allocated to and performed by different functional modules, that is, the internal structure of the apparatus is divided into different functional modules, to implement all or some of the functions described above. In addition, the reminder apparatus in a group session and the reminder method embodiments in the group session provided in the embodiments belong to the same concept. For the specific implementation process, reference may be made to the method embodiments, and details are not described herein again.

Figure 20:
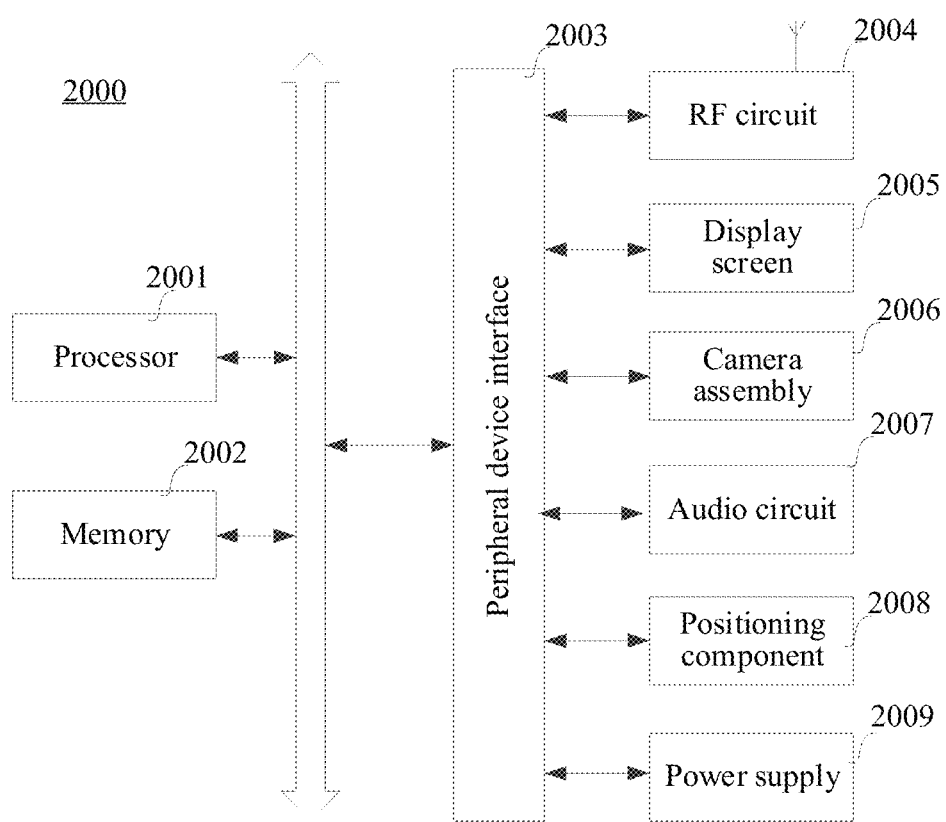
FIG. 20 is a schematic structural diagram of a computing device according to embodiment(s) of the present disclosure.

FIG. 20 is a structural block diagram of a computing device 2000 according to an exemplary embodiment of the present disclosure. The computing device 2000 may be a portable mobile terminal, such as a smartphone, a tablet computer, an MP3 player, or an MP4 player. The computing device 2000 may be further referred to as another name such as user equipment or a portable terminal.

Generally, the computing device 2000 includes a processor 2001 and a memory 2002.

The processor 2001 may include one or more processing cores, for example, a 4-core processor or an 8-core processor. The processor 2001 may be implemented in at least one hardware form of a digital signal processor (DSP), a field-programmable gate array (FPGA), and a programmable logic array (PLA). The processor 2001 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 2001 may be integrated with a graphics processing unit (GPU). The GPU is configured to render and draw content that may be displayed on a display screen. In some embodiments, the processor 2001 may further include an artificial intelligence (AI) processor. The AI processor is configured to process computing operations related to machine learning.

The memory 2002 may include one or more computer-readable storage media. The computer-readable storage medium may be tangible and non-transient. The memory 2002 may further include a high-speed random access memory and a nonvolatile memory, for example, one or more disk storage devices or flash storage devices. In some embodiments, the non-transient computer-readable storage medium in the memory 2002 is configured to store at least one instruction. The at least one instruction is executed by the processor 2001 to perform the method for controlling a virtual object to switch a virtual weapon provided in the present disclosure.

In some embodiments, the electronic device 2000 may further include: a peripheral device interface 2003 and at least one peripheral device. In certain embodiment(s), the peripheral device includes at least one of a radio frequency (RF) circuit 2004, a touch display screen 2005, a camera 2006, an audio circuit 2007, a positioning component 2008, and a power supply 2009.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person skilled in the art may understand that the structure shown in FIG. 20 does not constitute a limitation to the electronic device 2000, and the electronic device may include more components or fewer components than those shown in the figure, or some components may be combined, or a different component deployment may be used.

The memory further includes one or more programs. The one or more programs are stored in the memory and include steps to be executed by the computing device in the method provided in the embodiments of the present disclosure.

An embodiment of the present disclosure further provides a computer-readable storage medium, storing at least one instruction, at least one program, a code set, or an instruction set, the at least one instruction, the at least one program, the code set, or the instruction set being loaded and executed by a processor to implement the reminder method in a group session according to any one of the embodiments.

The present disclosure further provides a computer program product, the computer program product, when run on a computer, causing the computer to perform the reminder method in a group session according to the method embodiments.

A person of ordinary skill in the art may understand that all or some of the steps of the methods in the embodiments may be implemented by a program instructing relevant hardware. The program may be stored in a computer-readable storage medium. The computer-readable storage medium may be the computer-readable storage medium included in the memory in the embodiment, or may be a computer-readable storage medium that exists independently and that is not assembled in a terminal. The computer-readable storage medium stores at least one instruction, at least one program, a code set or an instruction set, the at least one instruction, the at least one program, the code set or the instruction set is loaded and executed by a processor to implement the reminder method in a group session according to the method embodiments.

"Plurality of" means two or more. "And/or" describes an association relationship for describing associated objects and represents that three relationships may exist. For example, A and/or B may represent the following three scenarios: Only A exists, both A and B exist, and only B exists. The character "/" in the present disclosure generally indicates an "or" relationship between the associated objects.

A person of ordinary skill in the art may understand that all or some of the steps of the embodiments may be implemented by hardware, or may be implemented by a program instructing relevant hardware. The program may be stored in a computer-readable storage medium. The storage medium may be a read-only memory, a magnetic disk, an optical disc, or the like.

The descriptions are embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A reminder generation method, applied to a terminal, comprising:
    displaying a group session interface of a group session, the group session being a group session in which a group member is allowed to use a group tool, the group tool being a program function that supports use by at least two group members together;
    displaying a group tool message in the group session interface, the group tool message including an entry link of the group tool; and
    displaying, in response to that the group tool message is a message with a group attribute, a reminder control corresponding to the group tool in the group session interface, the reminder control being used as a reminder of an item in the group tool.

2. The method according to claim 1, wherein the group session interface includes: a session area and a non-session area, the session area being an area used for displaying a group message, and wherein displaying the reminder control comprises:
    displaying the reminder control in the non-session area of the group session interface.

3. The method according to claim 2, wherein displaying the reminder control comprises:
    displaying the reminder control in a shape of a capsule in the non-session area of the group session interface.

4. The method according to claim 1, wherein at least one of the following information is displayed on the reminder control:
    an icon of the group tool;
    title content of the group tool;
    a headcount of members who have performed the item of the group tool in the group session;
    a total headcount in the group session; and
    a state indicating whether a local group member has performed the item of the group tool.

5. The method according to claim 1, further comprising:
    displaying, in response to that the group member uses the group tool, a message transmitting window of the group tool, a first setting control being displayed in the message transmitting window; and
    generating, in response to a setting operation on the first setting control, the group tool message with the group attribute.

6. The method according to claim 1, wherein a second setting control corresponding to the group tool message is further displayed on the group session interface, and the method further comprises:
    setting, in response to a setting operation on the second setting control, the group tool message to have the group attribute.

7. The method according to claim 1, further comprising:
    receiving a trigger operation on the group tool message or the reminder control, and displaying the item of the group tool; and
    canceling, in response to a completion confirmation operation on the reminder control, displaying the reminder control.

8. The method according to claim 1, further comprising:
    receiving a deleting operation on the reminder control, and canceling displaying the reminder control; or,
    in response to timeout of a timer that starts at a moment when the reminder control is generated, canceling displaying the reminder control; or,
    in response to that a total quantity of the reminder controls exceeds a threshold, canceling displaying a reminder control that is generated earliest and causes the total quantity to exceed the threshold.

9. The method according to claim 1, further comprising one or both of:
    requesting, in response to a withdrawal operation on the reminder control, a server to withdraw the group tool message and the reminder control of group members in the group session; and
    displaying a withdrawal message of the group tool message, the withdrawal message being triggered by a withdrawal operation of a group member with withdrawal authority in the group session; and canceling displaying the group tool message and the reminder control.

10. The method according to claim 1, wherein the group tool comprises at least one of the following:
    a group application;
    a mini program that runs relying on the application; and
    a group notice.

11. A reminder generation apparatus, the apparatus comprising: a memory storing computer program instructions; and a processor coupled to the memory and configured to execute the computer program instructions and perform:
    displaying a group session interface of a group session, the group session being a group session in which a group member is allowed to use a group tool, the group tool being a program function that supports use by at least two group members together;
    displaying a group tool message in the group session interface, the group tool message including an entry link of the group tool; and
    displaying, in response to that the group tool message is a message with a group attribute, a reminder control corresponding to the group tool in the group session interface, the reminder control being used as a reminder of an item in the group tool.

12. The reminder generation apparatus according to claim 11, wherein the group session interface includes: a session area and a non-session area, the session area being an area used for displaying a group message, and wherein displaying the reminder control includes:
displaying the reminder control in the non-session area of the group session interface.

13. The reminder generation apparatus according to claim 12, wherein displaying the reminder control includes:
displaying the reminder control in a shape of a capsule in the non-session area of the group session interface.

14. The reminder generation apparatus according to claim 11, wherein at least one of the following information is displayed on the reminder control:
an icon of the group tool;
title content of the group tool;
a headcount of members who have performed the item of the group tool in the group session;
a total headcount in the group session; and
a state indicating whether a local group member has performed the item of the group tool.

15. The reminder generation apparatus according to claim 11, wherein the processor is further configured to execute the computer program instructions and perform:
displaying, in response to that the group member uses the group tool, a message transmitting window of the group tool, a first setting control being displayed in the message transmitting window; and
generating, in response to a setting operation on the first setting control, the group tool message with the group attribute.

16. The reminder generation apparatus according to claim 11, wherein a second setting control corresponding to the group tool message is further displayed on the group session interface, and wherein the processor is further configured to execute the computer program instructions and perform:
setting, in response to a setting operation on the second setting control, the group tool message to have the group attribute.

17. The reminder generation apparatus according to claim 11, wherein the processor is further configured to execute the computer program instructions and perform:
receiving a trigger operation on the group tool message or the reminder control, and displaying the item of the group tool; and
canceling, in response to a completion confirmation operation on the reminder control, displaying the reminder control.

18. The reminder generation apparatus according to claim 11, wherein the processor is further configured to execute the computer program instructions and perform:
receiving a deleting operation on the reminder control, and canceling displaying the reminder control; or,
in response to timeout of a timer that starts at a moment when the reminder control is generated, canceling displaying the reminder control; or,
in response to that a total quantity of the reminder controls exceeds a threshold, canceling displaying a reminder control that is generated earliest and causes the total quantity to exceed the threshold.

19. The reminder generation apparatus according to claim 11, wherein the processor is further configured to execute the computer program instructions and perform one or both of:
requesting, in response to a withdrawal operation on the reminder control, a server to withdraw the group tool message and the reminder control of group members in the group session; and
displaying a withdrawal message of the group tool message, the withdrawal message being triggered by a withdrawal operation of a group member with withdrawal authority in the group session;
and canceling displaying the group tool message and the reminder control.

20. A non-transitory computer-readable storage medium storing computer program instructions executable by at least one processor to perform:
displaying a group session interface of the group session, the group session being a group session in which a group member is allowed to use a group tool, the group tool being a program function that supports use by at least two group members together;
displaying a group tool message in the group session interface, the group tool message including an entry link of the group tool; and
displaying, in response to that the group tool message is a message with a group attribute, a reminder control corresponding to the group tool in the group session interface, the reminder control being used as a reminder of an item in the group tool.

* * * * *